(12) United States Patent
Makimura et al.

(10) Patent No.: US 10,988,160 B2
(45) Date of Patent: Apr. 27, 2021

(54) CONTROLLER FOR ACTUATOR AND STEERING DEVICE

(71) Applicants: AISIN SEIKI KABUSHIKI KAISHA, Kariya (JP); TOYOTA JIDOSHA KABUSHIKI KAISHA, Toyota (JP)

(72) Inventors: Yuki Makimura, Chiryu (JP); Akitsugu Funahashi, Anjo (JP); Shin Murao, Nisshin (JP)

(73) Assignees: AISIN SEIKI KABUSHIKI KAISHA, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 570 days.

(21) Appl. No.: 15/874,254

(22) Filed: Jan. 18, 2018

(65) Prior Publication Data

US 2018/0201294 A1   Jul. 19, 2018

(30) Foreign Application Priority Data

Jan. 19, 2017   (JP) .............................. JP2017-007865

(51) Int. Cl.
| | |
|---|---|
| *B60W 50/16* | (2020.01) |
| *H02P 21/14* | (2016.01) |
| *B62D 1/181* | (2006.01) |
| *H02K 11/20* | (2016.01) |
| *B62D 1/183* | (2006.01) |

(52) U.S. Cl.
CPC ............ *B62D 1/181* (2013.01); *H02K 11/20* (2016.01); *B60W 2540/26* (2013.01); *B62D 1/183* (2013.01)

(58) Field of Classification Search
CPC ........ B60W 50/16; H02P 21/14; H02P 29/032
See application file for complete search history.

(56) References Cited

U.S. PATENT DOCUMENTS

| 2004/0124797 A1* | 7/2004 | Takeuchi .................. H02P 3/00 |
| | | 318/466 |
| 2013/0076290 A1* | 3/2013 | Yoshida ............. G01D 5/24476 |
| | | 318/652 |
| 2014/0305252 A1* | 10/2014 | Mizuno .................. B62D 1/187 |
| | | 74/493 |

FOREIGN PATENT DOCUMENTS

| JP | 2000-188892 A | 7/2000 |
| JP | 2004-132282 A | 4/2004 |
| JP | 2007-106180 A | 4/2007 |
| JP | 2010-246232 A | 10/2010 |

(Continued)

OTHER PUBLICATIONS

Office Action (Notification of Reasons for Refusal) dated Nov. 6, 2018, by the Japanese Patent Office in corresponding Japanese Patent Application No. 2017-007865 and an English Translation of the Office Action. (4 pages).

*Primary Examiner* — Kawing Chan
*Assistant Examiner* — Charles S Laughlin
(74) *Attorney, Agent, or Firm* — Buchanan, Ingersoll & Rooney PC (57) ABSTRACT

A controller for an actuator includes a lock detecting unit configured to detect a lock state of a motor and an abnormality detecting unit configured to detect an abnormality of the actuator. The abnormality detecting unit determines that an abnormality of the actuator is detected when it is determined that an operating position of the actuator does not change between a first lock position at which the lock state of the motor in a first rotation direction is detected and a second lock position at which the lock state of the motor in a second rotation direction is detected.

7 Claims, 8 Drawing Sheets

(56) References Cited

FOREIGN PATENT DOCUMENTS

| JP | 2011-010403 A | 1/2011 |
|----|---------------|--------|
| JP | 2014-206386 A | 10/2014 |
| JP | 5796776 B2 | 10/2015 |

* cited by examiner

LOCK DETECTION DETERMINATION

ABNORMALITY MODE: SHORT-CIRCUIT FAULT OF POWER SUPPLY LINE

FIG. 12

ABNORMALITY MODE: SHORT-CIRCUIT FAULT OF POWER SUPPLY LINE

CONTROLLER FOR ACTUATOR AND STEERING DEVICE

INCORPORATION BY REFERENCE

The disclosure of Japanese Patent Application No. 2017-007865 filed on Jan. 19, 2017 including the specification, drawings and abstract is incorporated herein by reference in its entirety.

BACKGROUND

1. Technical Field

The disclosure relates to a controller for an actuator and a steering device.

2. Description of Related Art

A controller for an actuator with a motor as a drive source that detects an operating position of the actuator by counting a pulse signal (a pulse edge) synchronized with rotation of the motor and output from a pulse sensor is known. For example, as described in Japanese Unexamined Patent Application Publication No. 2000-188892 (JP 2000-188892 A) or Japanese Unexamined Patent Application Publication No. 2010-246232 (JP 2010-246232 A), when a change of a pulse signal is not detected at the time of driving of a motor, it can be determined that the motor is in a non-rotating state, that is, in a locked state. For example, when a certain abnormality such as a fault of a pulse sensor or a signal detecting circuit occurs in the actuator including a control system thereof in addition to such a motor-locked state, a change of the pulse signal cannot be detected either. For example, by performing detection of an abnormality of an actuator using this fact, detection of a fault corresponding to each individual element such as a disconnection detecting circuit described in Japanese Unexamined Patent Application Publication No. 2014-206386 (JP 2014-206386 A) can be skipped.

SUMMARY

However, it is difficult to apply the above-mentioned configuration to a device in which rotation of a motor is constrained due to application of an external force, for example, a steering device described in Japanese Patent No. 579776. That is, for example, when an occupant is leaning on a steering wheel, there is a likelihood that a tilt actuator that tilts a steering shaft along with a steering column or a telescopic actuator that telescopes the steering shaft will not be able to operate against the occupant's weight. In the above-mentioned configuration, in this case, there is a likelihood that it will be erroneously detected that an abnormality has occurred in the actuator and thus there is room for improvement.

The disclosure provides a controller for an actuator and a steering device that can detect an abnormality of an actuator with a simple structure while preventing occurrence of erroneous detection.

A controller for an actuator according to a first aspect of the disclosure includes: a motor control unit configured to control rotation of a motor which is a drive source of an actuator; a pulse detecting unit configured to detect a pulse signal which is output from a pulse sensor disposed in the actuator and is synchronized with the rotation of the motor; a lock detecting unit configured to detect a lock state of the motor based on a change of the pulse signal; and an abnormality detecting unit configured to detect an abnormality of the actuator. The abnormality detecting unit determines that an abnormality of the actuator is detected when the lock state of the motor in a first rotation direction is detected and then the lock state of the motor in a second rotation direction is detected, and it is determined that an operating position of the actuator does not change between a first lock position at which the lock state of the motor in the first rotation direction is detected and a second lock position at which the lock state of the motor in the second rotation direction is detected.

According to this configuration, it is possible to detect a fault which has occurred in the actuator for various reasons such as the motor not rotating, a pulse signal synchronized with the rotation of the motor not being output, and a pulse signal not being able to be detected. Accordingly, it is possible to simplify a configuration for detecting an abnormality of the actuator. It is possible to prevent occurrence of erroneous detection due to temporary constraint of the rotation of the motor, for example, for reasons such as intrusion of foreign matters or application of a reverse input load. As a result, it is possible to smoothly use the actuator.

In the aspect, the controller may further include: a position detecting unit configured to detect the operating position of the actuator by counting the pulse signal; and a lock information storage unit configured to store the rotation direction of the motor and the operating position of the actuator in which the lock state is detected as lock information when the lock state of the motor is detected, and the abnormality detecting unit may determine that an abnormality of the actuator is detected when the lock state of the motor is newly detected, the rotation direction of the motor in which the lock state is newly detected and the rotation direction of the motor which is stored as the previous lock information are different from each other, and the operating position of the actuator at which the lock state is newly detected and the operating position of the actuator which is stored as the previous lock information are located within a predetermined position range.

According to this configuration, when the lock state of the motor in the first rotation direction is detected and then the lock state of the motor in the second direction is detected, and it is determined that the operating position of the actuator does not change between the first lock position and the second lock position, it is possible to detect an abnormality of the actuator.

In the aspect, the controller may further include: a lock information storage unit configured to store the rotation direction of the motor in which the lock state is detected as lock information when the lock state of the motor is detected; and a lock information erasing unit configured to erase the lock information when a change of the pulse signal synchronized with the rotation of the motor is detected, and the abnormality detecting unit may determine that an abnormality of the actuator is detected when the lock state of the motor is newly detected and the rotation direction of the motor in which the lock state is newly detected and the rotation direction of the motor which is stored as the previous lock information are different from each other.

That is, when the lock information is erased due to detection of a change of a pulse signal synchronized with the rotation of the motor, but the lock state of the motor in another rotation direction is newly detected with the lock information stored, it can be determined that the operating position of the actuator does not change therebetween. Accordingly, according to this configuration, when the lock state of the motor in the first rotation direction is detected and then the lock state of the motor in the second direction is detected, and it is determined that the operating position of the actuator does not change between the first lock position and the second lock position, it is possible to correctly detect an abnormality of the actuator with a simpler configuration.

In the aspect, the motor may be a DC motor with a brush, and the abnormality detecting unit may determine that an abnormality is a ground fault or a short-circuit fault which occurs in a power supply line of the motor when the lock state of the motor in the first rotation direction is detected continuously a plurality of times before the abnormality of the actuator is detected and the operating position of the actuator at which the lock state of the motor in the first rotation direction is detected gradually approaches the operating position of the actuator at which the abnormality is detected.

That is, when the motor of the actuator is a DC motor with a brush, the motor can rotate in only one direction of a forward rotation direction and a reverse rotation direction at the time of occurrence of a ground fault or a short-circuit fault. In this situation, when an operation request in the non-rotatable direction is issued two or more times, the above-mentioned determination condition is satisfied. Accordingly, according to the above-mentioned configuration, it is possible to accurately detect a ground fault or a short-circuit fault which occurs in a power supply line of the motor.

A steering device according to a second aspect of the disclosure includes: an actuator; and a controller configured to control rotation of a motor which is a drive source of the actuator, to detect a pulse signal which is output from a pulse sensor disposed in the actuator and is synchronized with the rotation of the motor, to detect a lock state of the motor based on a change of the pulse signal, to detect an abnormality of the actuator, and to determine that an abnormality of the actuator is detected when the lock state of the motor in a first rotation direction is detected and then the lock state of the motor in a second rotation direction is detected, and it is determined that an operating position of the actuator does not change between a first lock position at which the lock state of the motor in the first rotation direction is detected and a second lock position at which the lock state of the motor in the second rotation direction is detected.

In the aspect, the controller may be configured to detect the operating position of the actuator by counting the pulse signal, to store the rotation direction of the motor and the operating position of the actuator in which the lock state is detected as lock information when the lock state of the motor is detected, and to determine that an abnormality of the actuator is detected when the lock state of the motor is newly detected, the rotation direction of the motor in which the lock state is newly detected and the rotation direction of the motor which is stored as the previous lock information are different from each other, and the operating position of the actuator at which the lock state is newly detected and the operating position of the actuator which is stored as the previous lock information are located within a predetermined position range.

In the aspect, the controller may be configured to store the rotation direction of the motor in which the lock state is detected as lock information when the lock state of the motor is detected, to erase the lock information when a change of the pulse signal synchronized with the rotation of the motor is detected, and to determine that an abnormality of the actuator is detected when the lock state of the motor is newly detected and the rotation direction of the motor in which the lock state is newly detected and the rotation direction of the motor which is stored as the previous lock information are different from each other.

In the aspect, the motor may be a DC motor with a brush, and the controller may be configured to determine that an abnormality is a ground fault or a short-circuit fault which occurs in a power supply line of the motor when the lock state of the motor in the first rotation direction is detected continuously a plurality of times before the abnormality of the actuator is detected and the operating position of the actuator at which the lock state of the motor in the first rotation direction is detected gradually approaches the operating position of the actuator at which the abnormality is detected.

With the steering device according to the second aspect, it is possible to obtain the same advantages as in the controller according to the first aspect.

In the aspect, the actuator may be at least one of a tilt actuator that tilts a steering shaft supported by a steering column along with the steering column and a telescopic actuator that telescopes the steering shaft.

That is, in the steering device, foreign matters capable of hindering operation of the actuator may intrude into the steering device, or a reverse input load capable of hindering operation of the actuator may be applied to the steering device, for example, because an occupant is leaning on a steering wheel attached to a tip of the steering shaft. Accordingly, more remarkable advantages can be achieved by applying the controller for an actuator to the steering device.

According to the disclosure, it is possible to detect an abnormality of an actuator with a simple structure while preventing occurrence of erroneous detection.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
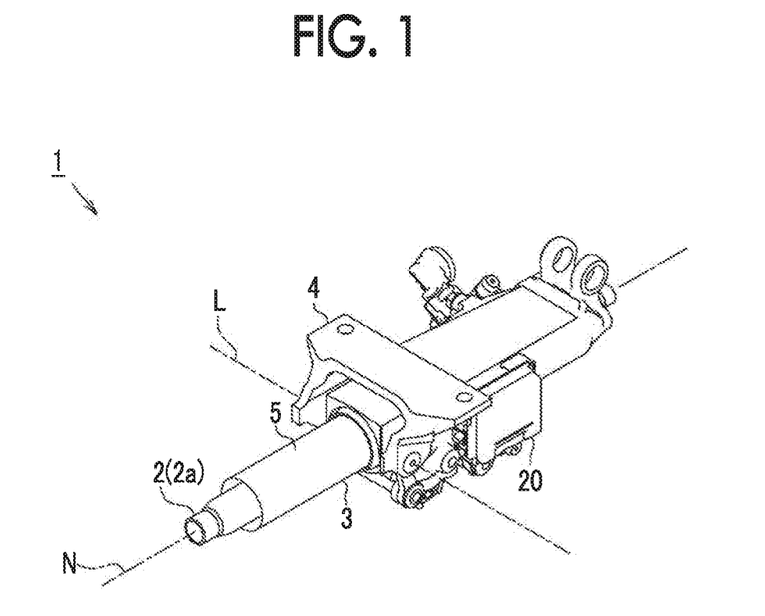
FIG. 1 is a perspective view of a steering device.
Figure 2:
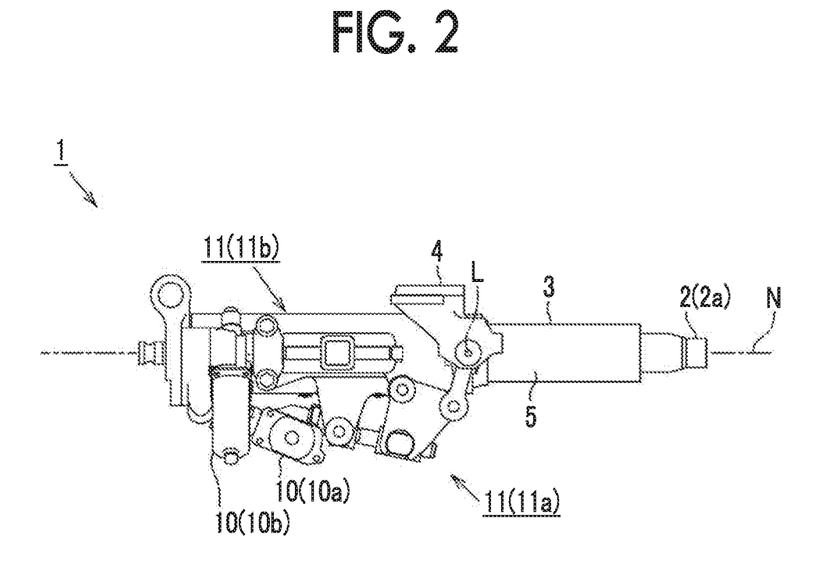
FIG. 2 is a lateral view of the steering device.

Hereinafter, an embodiment in which a controller for an actuator is applied to a steering device of a vehicle will be described with reference to the accompanying drawings. As illustrated in FIGS. 1 and 2, a steering device 1 of a vehicle includes a steering shaft 2 having a steering wheel which is not illustrated attached to a tip 2a thereof, a steering column 3 that rotatably supports the steering shaft 2, and a fixing bracket 4 that fixes the steering column 3 to a vehicle body which is not illustrated.

The steering column 3 according to this embodiment has a known configuration in which the steering shaft (a column shaft) 2 is accommodated in a support tube 5 that is formed in a substantially cylindrical shape. The fixing bracket 4 includes a support shaft L that extends horizontally to be perpendicular to an axis N of the steering shaft 2. The steering device 1 according to this embodiment includes a tilt actuator 11a that tilts the steering column 3 around the support shaft L using a motor 10 (10a) as a drive source and tilts the steering shaft 2 supported by the steering column 3 as a result.

The steering shaft 2 according to this embodiment is configured to transmit a rotational force and to telescope by spline-fitting two shaft-shaped members thereto. In the steering column 3 according to this embodiment, a pair of support tubes 5 (an outer tube and an inner tube) that rotatably support the two shaft-shaped members are arranged coaxially. The steering device 1 according to this embodiment includes a telescopic actuator 11b that telescopes the steering shaft 2 by relatively moving the two support tubes 5 in an axial direction using the motor 10 (10b) as a drive source.

The steering device 1 according to this embodiment includes a controller 20 that controls operations of the actuators 11 (11a and 11b). Specifically, the controller 20 controls operations of the actuators 11 by supplying driving power to the motors 10 (10a and 10b) of the actuators 11. In the steering device 1 according to this embodiment, a DC motor with a brush is employed as the motors 10 (10a and 10b) of the actuators 11. The controller 20 according to this embodiment changes a vertical position of the steering wheel attached to the tip 2a of the steering shaft 2 by controlling the operation of the tilt actuator 11a (tilt control) and changes a longitudinal position of the steering wheel by controlling the operation of the telescopic actuator 11b (telescopic control).

Figure 3:
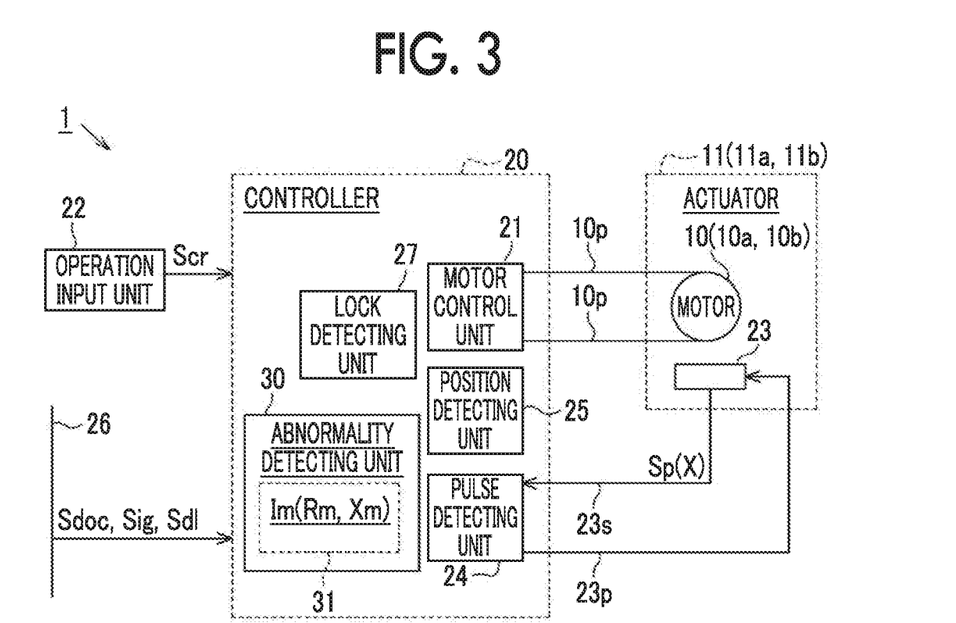
FIG. 3 is a control block diagram of an actuator which is provided in the steering device.

Specifically, as illustrated in FIG. 3, the controller 20 according to this embodiment includes a motor control unit 21 that controls rotation of the motors 10 which are drive sources of the actuators 11 by supplying driving power thereto. Specifically, for example, an operation input signal Scr indicating occurrence of an operation input to an operation input unit 22 such as an operation switch disposed around the steering wheel is input to the controller 20 according to this embodiment. That is, the controller 20 detects an operation request from an occupant to the actuators 11 based on the operation input signal Scr. The motor control unit 21 controls rotation of the motors 10 by supplying driving power thereto such that the actuator 11 operates based on the operation request.

A pulse sensor 23 that outputs a pulse signal Sp synchronized with the rotation of the motors 10 is provided in each actuator 11 according to this embodiment. The controller 20 according to this embodiment includes a pulse detecting unit 24 that detects the pulse signals Sp and a position detecting unit 25 that detects operating positions X (a tilt position and a telescopic position) of the actuators 11 by counting (pulse edges of) the pulse signals Sp.

Control signals such as an output signal Sdoc of a door sensor (a courtesy switch), an ignition signal Sig, and a door lock signal Sdl are input to the controller 20 according to this embodiment via an on-board network 26. The controller 20 according to this embodiment has a function of automatically changing the operating positions X of the actuators 11 (an automatic control function), for example, when an occupant gets on and off a vehicle.

Figure 4:
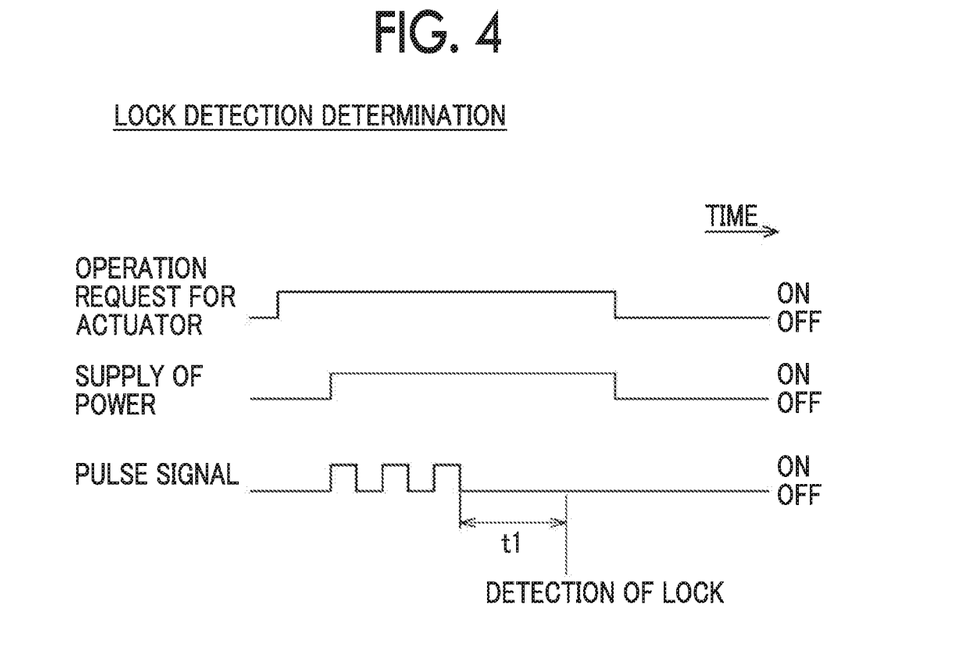
FIG. 4 is a diagram illustrating lock detection determination.

More specifically, the controller 20 according to this embodiment includes a lock detecting unit 27 that detects lock states of the motors 10 based on changes of the pulse signals Sp. As illustrated in FIG. 4, in the controller 20 according to this embodiment, the motor control unit 21 supplies driving power to the motors 10 of the actuators 11 by detecting an operation request for the actuators 11 based on the operation input signal Scr. In this embodiment, a waiting time (an operation start filter) for determining the operation request indicated by the operation input signal Scr from a time point at which the operation input signal Scr is input to a time point at which supply of driving power is started is set. When the motor 10 rotates with supply of driving power, the pulse sensor 23 disposed in each actuator 11 outputs the pulse signal Sp synchronized with the rotation of the motor 10. In the controller 20 according to this embodiment, the pulse detecting unit 24 detects the pulse signal Sp.

When such a motor is driven and the motor 10 enters a non-rotatable state, that is, in a lock state, the output level (Hi/Lo) of the pulse signal Sp synchronized with the rotation of the motor 10 does not change. The lock detecting unit 27 according to this embodiment detects that the motor 10 is in a lock state using that fact.

Specifically, the lock detecting unit 27 according to this embodiment determines whether the output level of the pulse signal Sp is constant for a predetermined time t1 or more. When the output level is constant for the predetermined time t1 or more, that is, the pulse signal Sp does not change, the lock detecting unit 27 is configured to determine that the motor 10 is in the lock state.

As illustrated in FIG. 3, the controller 20 according to this embodiment includes an abnormality detecting unit 30 that detects an abnormality which occurs in the actuator 11 based on a result of lock detection determination which is performed by the lock detecting unit 27.

Figure 5:
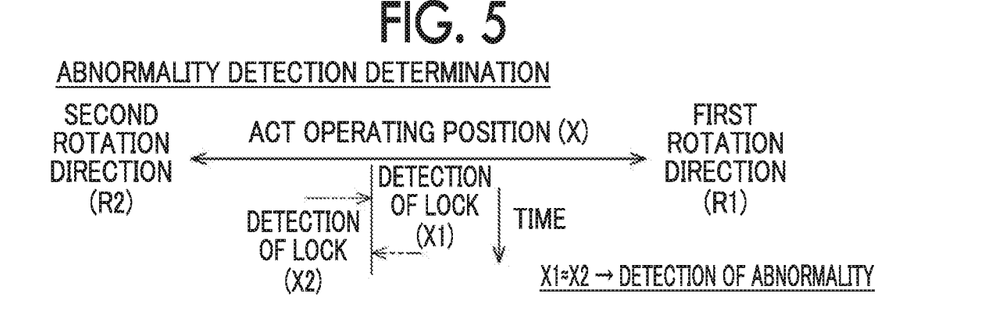
FIG. 5 is a diagram of abnormality detection determination.

Specifically, as illustrated in FIG. 5, the abnormality detecting unit 30 according to this embodiment monitors occurrence of a situation in which the lock state of the motor 10 in a first rotation direction R1 (for example, a forward rotation direction) is detected and then the lock state of the motor 10 in a second rotation direction R2 (for example, a reverse rotation direction) is detected. Then, the abnormality detecting unit 30 determines that an abnormality of the actuator 11 is detected when the operating position X of the actuator 11 does not change between a first lock position X1 at which the lock state of the motor 10 in the first rotation direction R1 is detected and a second lock position X2 at which the lock state of the motor 10 in the second rotation direction R2 is detected (X1≈X2, substantially equal).

Specifically, as illustrated in FIG. 3, when the lock state of the motor 10 is detected, the abnormality detecting unit 30 according to this embodiment holds (stores) the rotation direction R of the motor 10 and the operating position X of the actuator 11 in which the lock state is detected as lock information Im (Rm, Xm) in a storage area 31. When the lock state of the motor 10 is newly detected, the abnormality detecting unit 30 performs abnormality detection determination of the actuator 11 by comparing the rotation direction R of the motor 10 and the operating position X of the actuator 11 in which the lock state is newly detected with the previous lock information Im (Rm, Xm) stored in the storage area 31.

Figure 6:
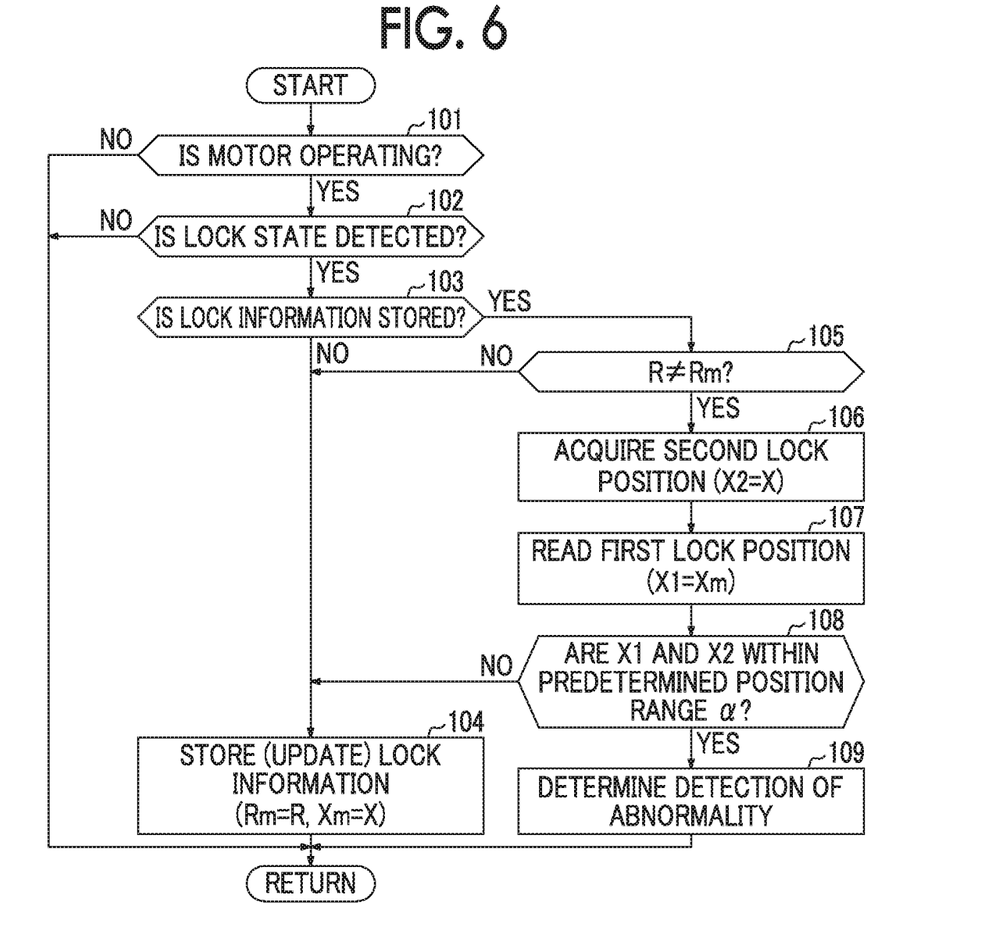
FIG. 6 is a flowchart illustrating a process routine of the abnormality detection determination.

Specifically, as illustrated in the flowchart of FIG. 6, when the motor 10 is operating (YES in Step 101) and the lock state of the motor 10 is newly detected (YES in Step 102), the abnormality detecting unit 30 according to this embodiment determines whether the lock information Im is stored in the storage area 31 (Step 103). When the lock information Im is not stored in the storage area 31 (NO in Step 103), the rotation direction R of the motor 10 and the operating position X of the actuator 11 in which the lock state is newly detected are stored as the lock information Im (Rm, Xm) in the storage area 31 (Rm=R and Xm=X, Step 104).

On the other hand, when it is determined in Step 103 that the lock information Im is stored in the storage area 31 (YES in Step 103), the abnormality detecting unit 30 determines whether the rotation direction R of the motor 10 in which the lock state is newly detected and the rotation direction Rm of the motor 10 which is stored as the previous lock information Im are different from each other (Step 105). When the rotation direction R of the motor 10 in which the lock state is newly detected and the rotation direction Rm of the motor 10 which is stored as the previous lock information Im are different from each other (R≠Rm, YES in Step 105), the abnormality detecting unit 30 acquires the operating position X of the actuator 11 at which the lock state is newly detected as the second lock position X2 (X2=X, Step 106).

Then, the abnormality detecting unit 30 according to this embodiment reads the operating position Xm of the actuator 11 which is stored as the previous lock information Im in the storage area 31 as the first lock position X1 (X1=Xm, Step 107). The abnormality detecting unit 30 determines whether the first lock position X1 and the second lock position X2 are located within a predetermined position range α (Step 108). When the first and second lock positions X1 and X2 are located within the predetermined position range α (YES in Step 108), the abnormality detecting unit 30 determines that the operating position X of the actuator 11 does not change between the first and second lock positions X1 and X2 (X1≈X2) and detects an abnormality of the actuator 11 (Step 109).

When it is determined in Step 101 that the motor is not operating (NO in Step 101), the abnormality detecting unit 30 according to this embodiment does not perform the processes of Step 102 and the steps subsequent thereto. When it is determined in Step 102 that the lock state of the motor 10 is not detected (NO in Step 102), the abnormality detecting unit 30 does not perform the processes of Step 103 and the steps subsequent thereto.

When it is determined in Step 105 that the rotation direction R of the motor 10 in which the lock state is newly detected and the rotation direction Rm of the motor 10 which is stored as the previous lock information Im are equal to each other (NO in Step 105), the abnormality detecting unit 30 according to this embodiment performs the process of Step 104. When it is determined in Step 108 that the first and second lock positions X1 and X2 are not located within the predetermined position range α (NO in Step 108), the abnormality detecting unit 30 also performs the process of Step 104. Accordingly, the lock information Im stored in the storage area 31 is updated with the rotation direction R of the motor 10 and the operating position X of the actuator 11 in which the lock state is newly detected (Rm=R and Xm=X, Step 104).

Figure 7:
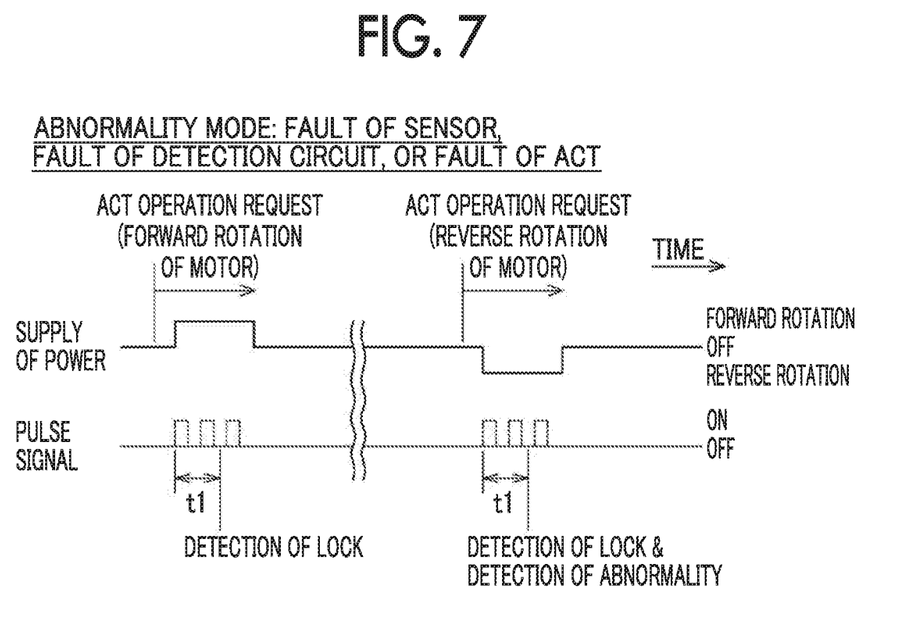
FIG. 7 is a diagram illustrating an abnormality detection determining operation (a fault in a mechanical system and a signal detection system)

Operational advantages of the abnormality detection determination which is performed by the abnormality detecting unit 30 according to this embodiment will be described below. As illustrated in FIG. 7, when a mechanical fault such as a fault in which the actuator 11 cannot move in addition to a fault of the motor 10 itself occurs, the output level of the pulse signal Sp output from the pulse sensor 23 disposed in the actuator 11 does not change. Accordingly, in this case, the abnormality of the actuator 11 is detected by issuing an operation request for the actuator 11 to rotate the motor 10 in the first rotation direction (for example, the forward rotation direction) and then issuing an operation request for the actuator 11 to rotate the motor 10 in the second rotation direction (for example, the reverse rotation direction).

When a fault of a control board or a Hall IC constituting the pulse sensor 23 or a disconnection fault of a power supply line 23*p* (see FIG. 3) occurs, the pulse sensor 23 cannot output the pulse signal Sp. Accordingly, in this case, an abnormality of the actuator 11 is detected by issuing an operation request to rotate the motor 10 in the first and second rotation directions.

When a fault of a detection circuit constituting the pulse detecting unit 24 on the controller 20 side or a disconnection fault of a signal line 23*s* of the pulse sensor 23 (see FIG. 3) occurs, the pulse detecting unit 24 cannot detect the pulse signal Sp. In this case, an abnormality of the actuator 11 is detected by issuing an operation request to rotate the motor 10 in the first and second rotation directions.

Figure 8:
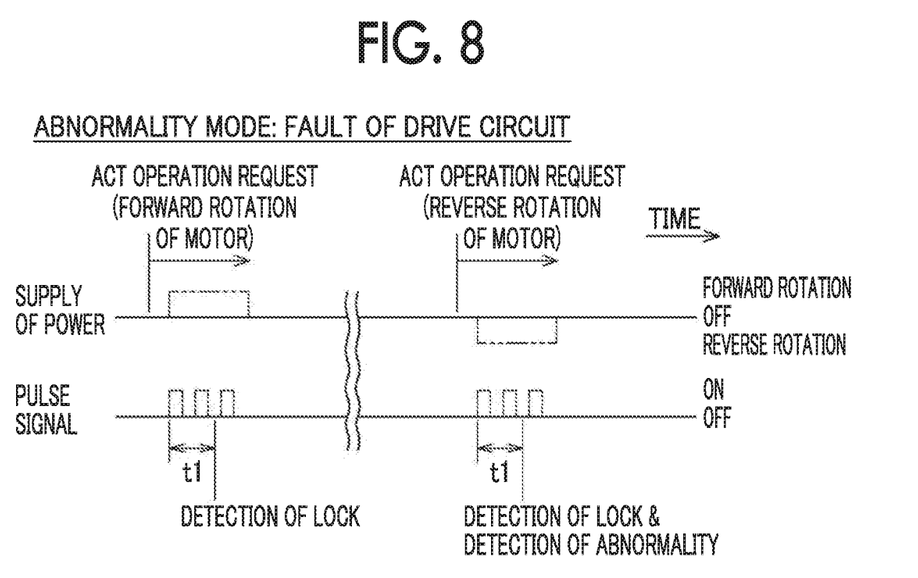
FIG. 8 is a diagram illustrating an abnormality detection determining operation (a fault in a motor driving system)

As illustrated in FIG. 8, when a fault of a drive circuit constituting the motor control unit 21 on the controller 20 side or a disconnection fault of a power supply line 10*p* of the motor 10 (see FIG. 3) occurs, driving power is not supplied to the motor 10. That is, in this case, the motor 10 does not rotate and thus the pulse signal Sp does not change. Accordingly, in this case, an abnormality of the actuator 11 is detected by issuing an operation request to rotate the motor 10 in the first and second rotation directions.

Figure 9:
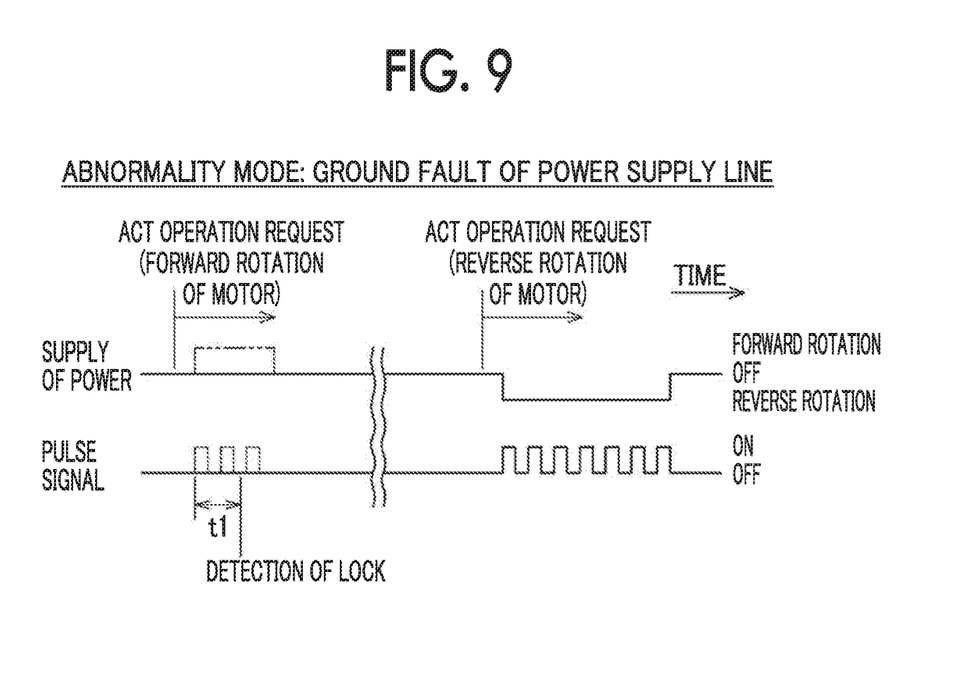
FIG. 9 is a diagram illustrating an abnormality detection determining operation (a ground fault)
Figure 10:
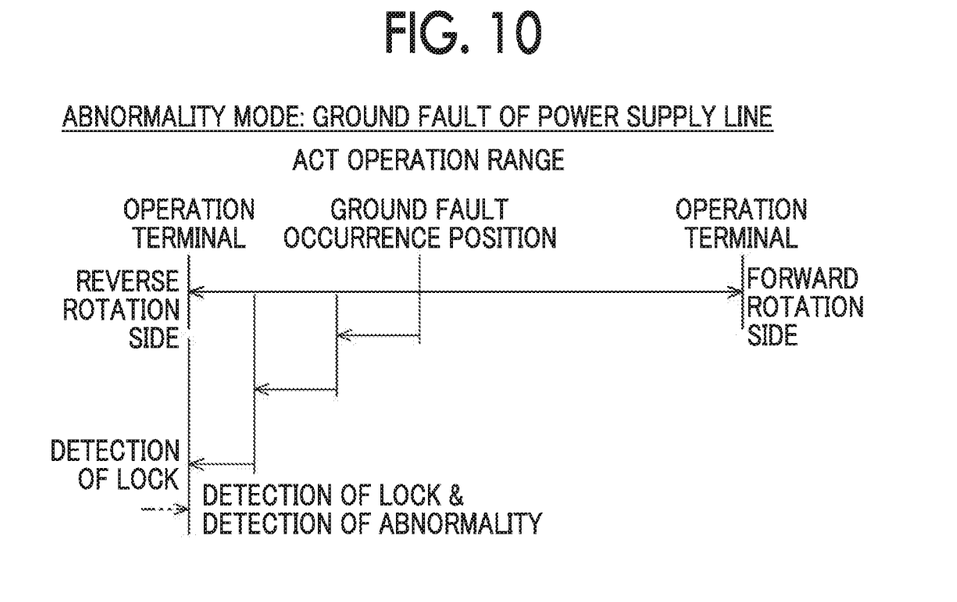
FIG. 10 is a diagram illustrating an abnormality detection determining operation (a ground fault)

As illustrated in FIGS. 9 and 10, when a ground fault occurs in the power supply line 10*p* of the motor 10, that is, when one of two power supply lines 10*p* is stuck at a low potential (for example, a ground voltage), the motor 10 can rotate in only one direction of the forward rotation direction and the reverse rotation direction depending on the power supply line 10*p* in which the disconnection fault occurs.

For example, in the example illustrated in FIG. 9, when an operation request to rotate the motor 10 in the forward rotation direction is issued due to occurrence of a ground fault, both of the two power supply lines 10*p* have the ground voltage. In this case, the motor 10 cannot rotate forward and thus the lock state of the motor 10 is detected.

On the other hand, in this example, when an operation request to rotate the motor 10 in the reverse rotation direction is issued, the power supply line 10*p* on which the ground fault occurs has the ground voltage and the other power supply line 10*p* has a source voltage, whereby the motor 10 cannot rotate.

However, in this case, the operating position X of the actuator 11 reaches an operation terminal (an end position on a reverse rotation side) of the actuator 11 and thus the rotation of the motor 10 is constrained, as illustrated in FIG. 10. That is, in this state, when an operation request for the actuator 11 is issued, the lock state of the motor 10 is detected regardless of whether the rotation direction of the motor 10 indicated by the operation request is the forward rotation direction or the reverse rotation direction. Accordingly, in this case, an abnormality of the actuator 11 is detected by issuing an operation request to rotate the motor 10 in the first and second rotation directions.

In the example illustrated in FIG. 10, By detecting the lock state of the motor 10 in a state in which the motor 10 rotates in the forward rotation direction after the motor 10 enters the lock state in a state in which the motor 10 rotates in the reverse rotation direction, the reverse rotation direction of the motor 10 is set as the first rotation direction and the forward rotation direction is set as the second rotation direction, but the same is true in a case in which the relationship is reversed.

Figure 11:
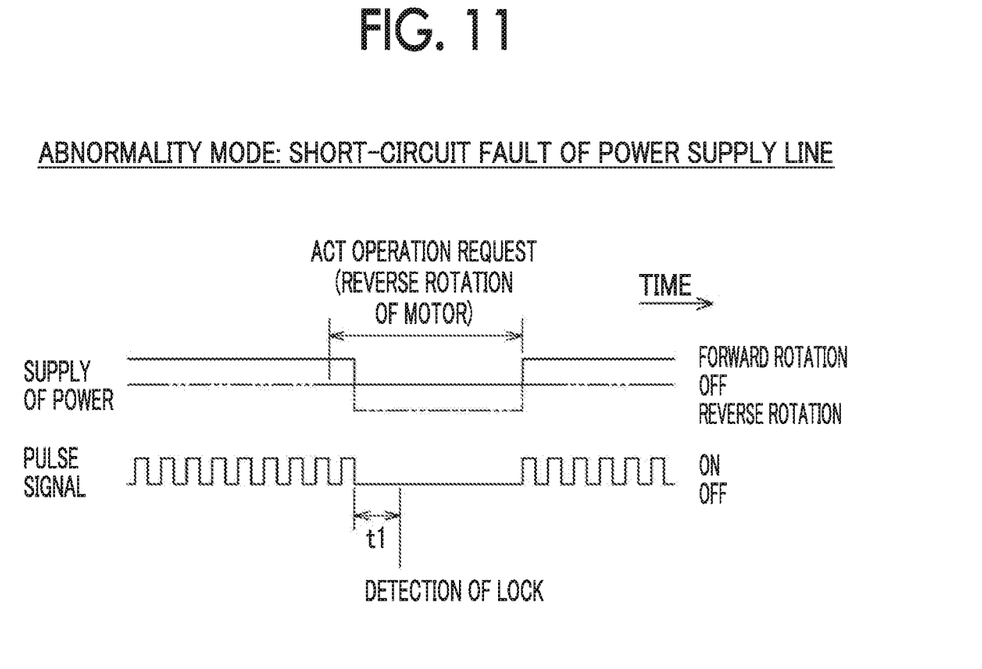
FIG. 11 is a diagram illustrating an abnormality detection determining operation (a short-circuit fault)
Figure 12:
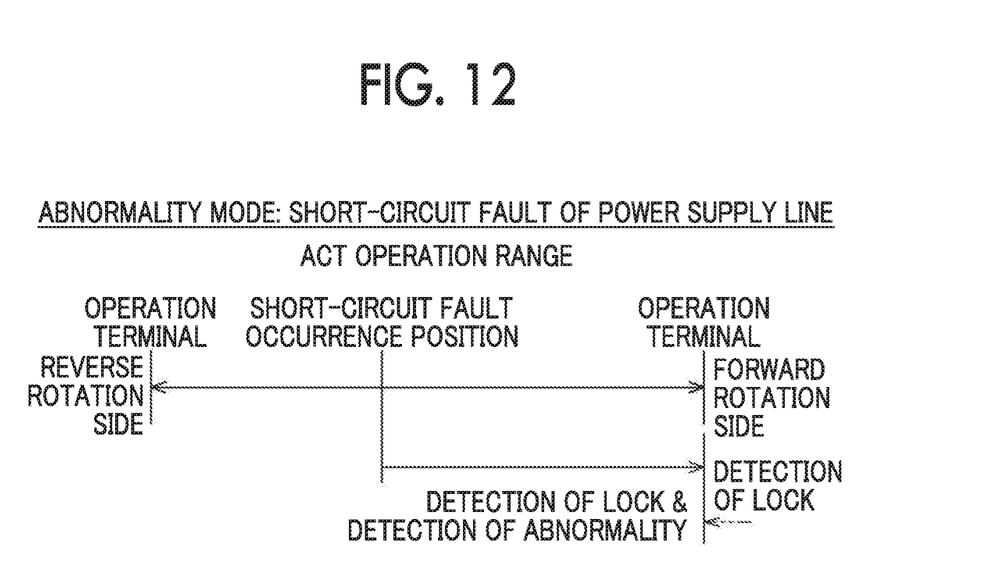
FIG. 12 is a diagram illustrating an abnormality detection determining operation (a short-circuit fault)

As illustrated in FIGS. 11 and 12, when a short-circuit fault occurs in the power supply lines 10p of the motor 10, that is, when one of the two power supply lines 10p is stuck at a high potential (for example, a source voltage), the motor 10 rotates in one rotation direction of the forward rotation direction and the reverse rotation direction without depending on motor driving control.

For example, in the example illustrated in FIG. 11, a short-circuit fault occurs and the motor 10 rotates in the forward rotation direction. In this case, by issuing an operation request to rotate the motor 10 in the reverse rotation direction, both of the two power supply lines 10p have the source voltage. Accordingly, the rotation of the motor 10 stops and thus the lock state of the motor 10 is detected.

When the operation request to rotate the motor 10 in the reverse rotation direction is interrupted, the motor 10 rotates again in the forward rotation direction. As illustrated in FIG. 12, the operating position X of the actuator 11 reaches an operation terminal (an end position on a forward rotation side) of the actuator 11 and thus rotation of the motor 10 is constrained.

That is, in this state, when an operation request for the actuator 11 is issued, the lock state of the motor 10 is detected regardless of whether the rotation direction of the motor 10 indicated by the operation request is the forward rotation direction or the reverse rotation direction. Accordingly, in this case, an abnormality of the actuator 11 is detected by issuing an operation request to rotate the motor 10 in the first and second rotation directions.

In the example illustrated in FIG. 12, by detecting the lock state of the motor 10 in a state in which the motor 10 rotates in the reverse rotation direction after the motor 10 enters the lock state in a state in which the motor 10 rotates in the forward rotation direction, the forward rotation direction of the motor 10 is set as the first rotation direction and the reverse rotation direction is set as the second rotation direction, but the same is true in a case in which the relationship is reversed.

Figure 13:
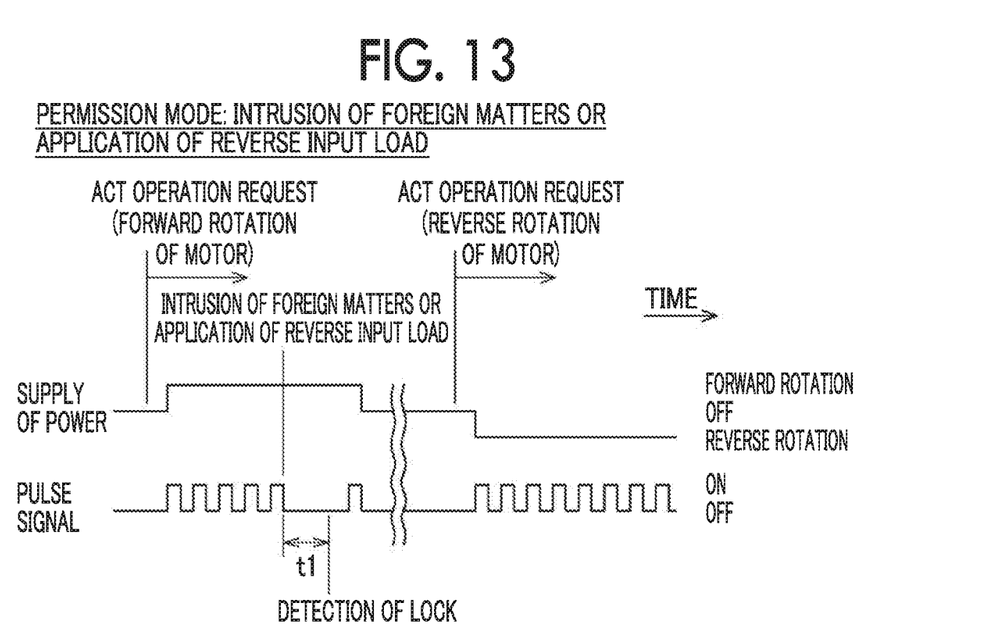
FIG. 13 is a diagram illustrating an abnormality detection determining operation (at the time of intrusion of foreign matters or application of a reverse input load)

As illustrated in FIG. 13, for example, even when foreign matters intrude or a reverse input load in a direction opposite to the operating direction of the actuator 11 is applied, the pulse signal Sp does not change (or is delayed) due to constraint of the rotation of the motor 10. Accordingly, the lock state of the motor 10 is detected.

However, in this case, the actuator 11 can reverse the operating direction. That is, when an operation request to rotate the motor 10 in the second rotation direction (for example, the reverse rotation direction) which is opposite to the first rotation direction (for example, the forward rotation direction) in which the lock state is detected is issued, the pulse signal Sp synchronized with the rotation of the motor 10 is detected. Accordingly, it is determined that an abnormality does not occur in the actuator 11.

That is, when the reason for detection of the lock state is, for example, a state in which an occupant leans on the steering wheel, a weight load of the occupant hindering the rotation of the motor 10 is released eventually. When the reason for detection of the lock state is, for example, intrusion of foreign matters, the operation range of the actuator 11 decreases but most of the foreign matters intruding into the operation range are removed eventually. In this case, the abnormality detecting unit 30 according to this embodiment is configured for the abnormality detection determination avoid hindering use of the steering device 1 by not determining that an abnormality occurs in the actuator 11.

According to the above-mentioned embodiment, the following advantages can be obtained. (1) The controller 20 includes the pulse detecting unit 24 that detects the pulse signal Sp which is output from the pulse sensor 23 disposed in the actuator 11 and is synchronized with the rotation of the motor 10, and the lock detecting unit 27 that detects a lock state of the motor 10 based on a change of the pulse signal Sp. The controller 20 further includes the abnormality detecting unit 30 that detects an abnormality which occurs in the actuator 11 based on a result of the lock detection determination which is performed by the lock detecting unit 27. The abnormality detecting unit 30 monitors occurrence of a situation in which the lock state of the motor 10 in the first rotation direction R1 is detected and then the lock state of the motor 10 in the second rotation direction R2 is detected. Then, the abnormality detecting unit 30 determines that an abnormality of the actuator 11 is detected when it is determined that the operating position X of the actuator 11 does not change between the first lock position X1 at which the lock state of the motor 10 in the first rotation direction R1 is detected and the second lock position X2 at which the lock state of the motor 10 in the second rotation direction R2 is detected.

According to this configuration, it is possible to detect a fault which has occurred in the actuator 11 for various reasons such as the motor 10 not rotating, a pulse signal Sp synchronized with the rotation of the motor 10 not being output, and a pulse signal Sp not being able to be detected. Accordingly, it is possible to simplify a configuration for detecting an abnormality of the actuator 11. It is possible to prevent occurrence of erroneous detection due to temporary constraint of the rotation of the motor 10, for example, for the reasons such as intrusion of foreign matters or application of a reverse input load. As a result, it is possible to smoothly use the actuator 11.

Particularly, in the steering device 1, intrusion of foreign matters for hindering the operation of the actuator may occur, or a reverse input load hindering the operation of the actuator 11 such as an occupant leaning on the steering wheel attached to the tip 2a of the steering shaft 2 may be applied to the steering wheel. Accordingly, more remarkable advantages can be obtained by applying the embodiment to this configuration.

(2) The controller 20 further includes: the position detecting unit 25 that detects the operating position X of the actuator 11 by counting the pulse signal Sp. When the lock state of the motor 10 is detected, the abnormality detecting unit 30 stores the rotation direction R of the motor 10 and the operating position X of the actuator 11 in which the lock state is detected as the lock information Im (R, X) in the storage area 31. When the lock state of the motor 10 is newly detected, the abnormality detecting unit 30 determines whether the rotation direction R of the motor 10 in which the lock state is newly detected and the rotation direction Rm of the motor 10 which is stored as the previous lock information Im in the storage area 31 are different from each other (Step 105). The abnormality detecting unit 30 determines whether the operating position Xm of the actuator 11 at which the lock state is newly detected and the operating position Xm of the actuator 11 which is stored as the previous lock information Im in the storage area 31 are located within the predetermined position range α (Step 108). When such determination conditions are satisfied (YES in Step 105 and YES in Step 108), the abnormality detecting unit 30 determines that an abnormality of the actuator 11 is detected.

According to this configuration, when the lock state of the motor 10 in the first rotation direction R1 is detected and then the lock state of the motor 10 in the second rotation direction R2 is detected, and it is determined that the operating position X of the actuator 11 does not change between the first lock position X1 and the second lock position X2, it is possible to detect an abnormality of the actuator 11.

The embodiment may be modified as follows. In the embodiment, a DC motor with a brush is employed as the motor 10 of the actuator 11, but the embodiment may be applied to a configuration in which a brushless motor is used as a drive source.

In the embodiment, the controller 20 that can detect abnormalities of the actuators 11 such as the tilt actuator 11a and the telescopic actuator 11b which are disposed in the steering device 1 has been implemented. However, the embodiment is not limited thereto, but may be applied to a steering device including one of the tilt actuator 11a and the telescopic actuator 11b. The embodiment may be applied for detection of an abnormality of an actuator which is not used in the steering device 1.

In the embodiment, when the first and second lock positions X1 and X2 are not located within the predetermined position range α (see FIG. 6, NO in Step 108), the lock information Im stored in the storage area 31 is updated (Rm=R and Xm=X, Step 104). When the rotation direction R of the motor 10 in which the lock state is newly detected is the same as the rotation direction Rm of the motor 10 which is stored as the previous lock information Im (NO in Step 105), the lock information Im is updated.

Figure 14:
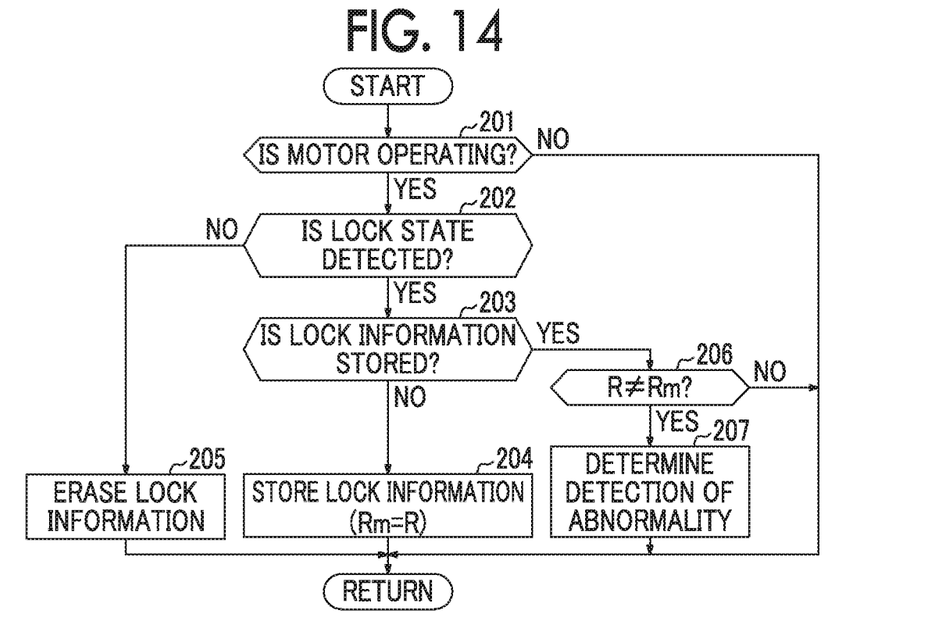
FIG. 14 is a flowchart illustrating a process routine of abnormality detection determination according to another example.

However, the embodiment is not limited thereto, but when the lock state of the motor 10 is detected (YES in Step 202) and the lock information Im is not stored in the storage area 31 (NO in Step 203), the rotation direction R of the motor 10 in which the lock state is newly detected is stored as the lock information Im as illustrated in the flowchart of FIG. 14 (RM=R, Step 204). When the motor 10 is operating (YES in Step 201) and the lock state of the motor 10 is not detected (NO in Step 202), that is, when a change of the pulse signal Sp synchronized with the rotation of the motor 10 is detected, the lock information Im stored in the storage area 31 is erased (Step 205). When the lock state of the motor 10 is newly detected and the rotation direction R of the motor 10 is different from the rotation direction Rm of the motor 10 which is stored as the previous lock information Im (YES in Step 202, YES in Step 203, and YES in Step 206), it may be determined that an abnormality of the actuator 11 is detected (Step 207).

That is, when the lock information Im is erased due to detection of a change of the pulse signal Sp synchronized with the rotation of the motor 10 but the lock state of the motor 10 in the other rotation direction is newly detected with the lock information Im stored, it can be determined that there is no change in the operating position X of the actuator 11 in the meantime.

Therefore, according to the above-mentioned configuration, with a simpler configuration, it is possible to determine that the operating position X of the actuator 11 does not change between the first lock position X1 and the second lock position X2 by detecting the lock state of the motor 10 in the first rotation direction R1 and then detecting the lock state of the motor 10 in the second rotation direction R2.

When first and second lock positions X1 and X2 are not located within the predetermined position range α (NO in Step 108), the lock information Im stored in the storage area 31 may be erased. With this configuration, similarly to the configuration according to the above-mentioned embodiment, it is possible to avoid occurrence of erroneous detection when the first and second lock positions X1 and X2 match each other.

In the above-mentioned embodiment, when the lock state of the motor 10 is detected, the abnormality detecting unit 30 stores the rotation direction R of the motor 10 and the operating position X of the actuator 11 in which the lock state is detected as the lock information Im (Rm, Xm) in the storage area 31. The lock information Im is updated from time to time.

Figure 15:
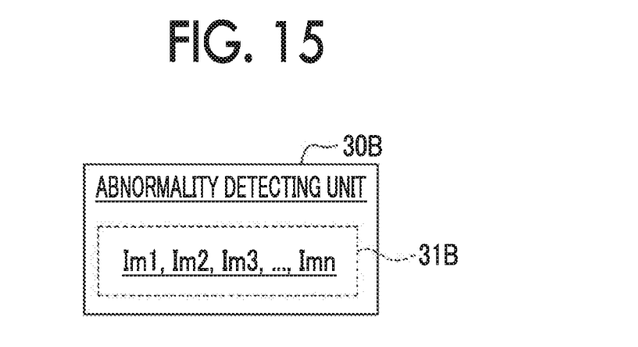
FIG. 15 is a block diagram illustrating a configuration of an abnormality detecting unit according to another example.

However, the embodiment is not limited thereto, and in an abnormality detecting unit 30B illustrated in FIG. 15, a history of the lock information Im is stored in a storage area 31B (Im1, Im2, Im2, Imn). In this example, the lock information Im1 having the lowest final numeral is the newest, and the lock information becomes older in the order of Im2, Im3, Imn as the final numerals increases. A fault occurring in the actuator 11 may be specified based on the history of the lock information Im.

For example, it is determined whether the lock state of the motor 10 in the first rotation direction R1 is detected continuously a plurality of times before an abnormality of the actuator 11 is detected. It is also determined whether the operating position X of each actuator at which the lock state of the motor 10 in the first rotation direction R1 is detected gradually approaches the operating position X (an abnormality detection position X0) of the actuator 11 at which the abnormality is detected. When the motor 10 of the actuator 11 is a DC motor with a brush and such determination conditions are satisfied, it is possible to determine that the detected abnormality of the actuator 11 is a ground fault or a short-circuit fault occurring in the power supply line 10p of the motor 10.

That is, when a ground fault or a short-circuit fault occurs, the motor 10 can rotate in only one rotation direction of the forward rotation direction and the reverse rotation direction (see FIGS. 9 to 12). In this situation, when an operation request in the non-rotatable direction is issued a plurality of times, the above-mentioned determination conditions are satisfied.

Figure 16:
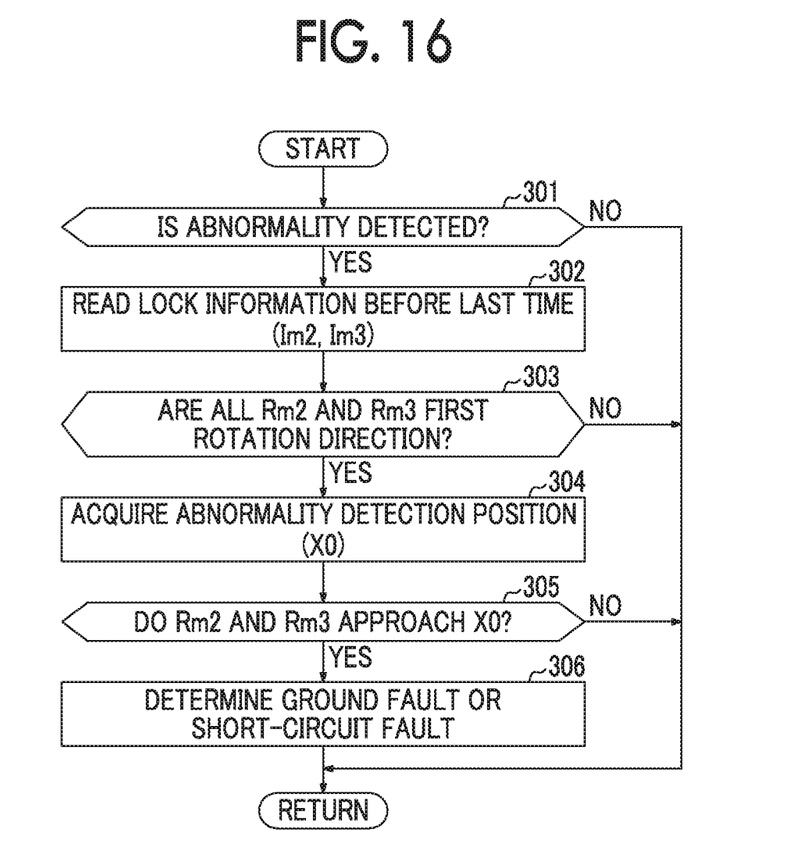
FIG. 16 is a flowchart illustrating a process routine of fault specification determination.

Specifically, as illustrated in the flowchart of FIG. 16, when an abnormality of the actuator 11 is detected (YES in Step 301), the abnormality detecting unit 30B reads the lock information Im from before the last time from the storage area 31B (Step 302). In this example, the abnormality detecting unit 30B reads the lock information from two times including the lock information Im2 from the time before last and the lock information Im 3 previous thereto, but the number of pieces of lock information that are read may be arbitrarily changed. Then, the abnormality detecting unit 30B determines whether all the rotation directions Rm2 and Rm3 stored as the lock information Im2 and Im3 from before the last time are the first rotation direction R1 (Step 303).

That is, when an abnormality of the actuator 11 is detected, the rotation direction Rm of the motor 10 which is stored as the last lock information Im 1 is the first rotation direction R1. Accordingly, when all the rotation directions Rm2 and Rm3 which are stored as the lock information Im2 and Im3 before the last time are the first rotation direction R1 (YES in Step 303), it can be determined that the lock state of the motor 10 in the first rotation direction R1 has been detected continuously a plurality of times (three times in this case) before the abnormality of the actuator 11 was detected.

Then, the abnormality detecting unit 30B acquires the abnormality detection position X0 at which an abnormality of the actuator 11 is detected (Step 304), and determines whether the operating positions Xm2 and Xm3 of the actuator 11 which are stored as the lock information Im2 and Im3 before the last time gradually approach the abnormality detection position X0 (Step 305). Then, when the determination condition of Step 305 is satisfied (YES in Step 305), it can be determined that the detected abnormality of the actuator 11 is a ground fault or a short-circuit fault occurring in the power supply line 10p of the motor 10 (Step 306).

In the above-mentioned embodiment, the storage area 31 serving as the lock information storage unit and the lock information erasing unit is described as being incorporated into the abnormality detecting unit 30 (see FIG. 3), but the lock information storage unit and the lock information erasing unit may be independent from the abnormality detecting unit 30.

Technical ideas which can be understood from the above-mentioned embodiment will be described below along with advantages thereof. An abnormality detecting device includes a lock detecting unit that detects a lock state of a motor based on a change of a pulse signal synchronized with rotation of the motor which is a drive source of an actuator, and determines that an abnormality of the actuator is detected when the lock state of the motor in a first rotation direction is detected and then the lock state of the motor in a second rotation direction is detected, and it is determined that an operating position of the actuator does not change between a first lock position at which the lock state of the motor in the first rotation direction is detected and a second lock position at which the lock state of the motor in the second rotation direction is detected. Accordingly, it is possible to prevent occurrence of erroneous detection and to detect an abnormality of an actuator with a simple structure.

What is claimed is:

1. A controller for an actuator, comprising:
a motor control unit configured to control rotation of a motor which is a drive source of an actuator;
a pulse detecting unit configured to detect a pulse signal which is output from a pulse sensor disposed in the actuator and is synchronized with the rotation of the motor;
a lock detecting unit configured to detect a lock state of the motor based on a change of the pulse signal; and
an abnormality detecting unit configured to detect an abnormality of the actuator, wherein the abnormality detecting unit determines that an abnormality of the actuator is detected when the lock state of the motor in a first rotation direction is detected and then the lock state of the motor in a second rotation direction is detected, and it is determined that an operating position of the actuator does not change between a first lock position at which the lock state of the motor in the first rotation direction is detected and a second lock position at which the lock state of the motor in the second rotation direction is detected, wherein
the motor is a DC motor with a brush; and
the abnormality detecting unit determines that an abnormality is a ground fault or a short-circuit fault which occurs in a power supply line of the motor when the lock state of the motor in the first rotation direction is detected continuously a plurality of times before the abnormality of the actuator is detected and the operating position of the actuator at which the lock state of the motor in the first rotation direction is detected gradually approaches the operating position of the actuator at which the abnormality is detected.

2. The controller according to claim 1, further comprising:
a position detecting unit configured to detect the operating position of the actuator by counting the pulse signal; and
a lock information storage unit configured to store the rotation direction of the motor and the operating position of the actuator in which the lock state is detected as lock information when the lock state of the motor is detected, wherein the abnormality detecting unit determines that an abnormality of the actuator is detected when the lock state of the motor is newly detected, the rotation direction of the motor in which the lock state is newly detected and the rotation direction of the motor which is stored as the previous lock information are different from each other, and the operating position of the actuator at which the lock state is newly detected and the operating position of the actuator which is stored as the previous lock information are located within a predetermined position range.

3. The controller according to claim 1, further comprising:
a lock information storage unit configured to store the rotation direction of the motor in which the lock state is detected as lock information when the lock state of the motor is detected; and
a lock information erasing unit configured to erase the lock information when a change of the pulse signal synchronized with the rotation of the motor is detected, wherein the abnormality detecting unit determines that an abnormality of the actuator is detected when the lock state of the motor is newly detected and the rotation direction of the motor in which the lock state is newly detected and the rotation direction of the motor which is stored as the previous lock information are different from each other.

4. A steering device comprising:
an actuator; and
a controller configured to control rotation of a motor which is a drive source of the actuator, to detect a pulse signal which is output from a pulse sensor disposed in the actuator and is synchronized with the rotation of the motor, to detect a lock state of the motor based on a change of the pulse signal, to detect an abnormality of the actuator, and to determine that an abnormality of the actuator is detected when the lock state of the motor in a first rotation direction is detected and then the lock state of the motor in a second rotation direction is detected and, it is determined that an operating position of the actuator does not change between a first lock position at which the lock state of the motor in the first rotation direction is detected and a second lock position at which the lock state of the motor in the second rotation direction is detected, wherein the motor is a DC motor with a brush; and the controller is configured to determine that an abnormality is a ground fault or a short-circuit fault which occurs in a power supply line of the motor when the lock state of the motor in the first rotation direction is detected continuously a plurality of times before the abnormality of the actuator is detected and the operating position of the actuator at which the lock state of the motor in the first rotation direction is detected gradually approaches the operating position of the actuator at which the abnormality is detected.

5. The steering device according to claim 4, wherein the controller is configured to detect the operating position of the actuator by counting the pulse signal, to store the rotation direction of the motor and the operating position of the actuator in which the lock state is detected as lock information when the lock state of the motor is detected, and to determine that an abnormality of the actuator is detected when the lock state of the motor is newly detected, the rotation direction of the motor in which the lock state is newly detected and the rotation direction of the motor which is stored as the previous lock information are different from each other, and the operating position of the actuator at which the lock state is newly detected and the operating position of the actuator which is stored as the previous lock information are located within a predetermined position range.

6. The steering device according to claim 4, wherein the controller is configured to store the rotation direction of the motor in which the lock state is detected as lock information when the lock state of the motor is detected, to erase the lock information when a change of the pulse signal synchronized with the rotation of the motor is detected, and to determine that an abnormality of the actuator is detected when the lock state of the motor is newly detected and the rotation direction of the motor in which the lock state is newly detected and the rotation direction of the motor which is stored as the previous lock information are different from each other.

7. The steering device according to claim 4, wherein the actuator is at least one of a tilt actuator that tilts a steering shaft supported by a steering column along with the steering column and a telescopic actuator that telescopes the steering shaft.

* * * * *